April 13, 1948.                H. J. FINDLEY                2,439,686
                          DRIVE FOR AIR COMPRESSORS
                            Filed Aug. 24, 1944
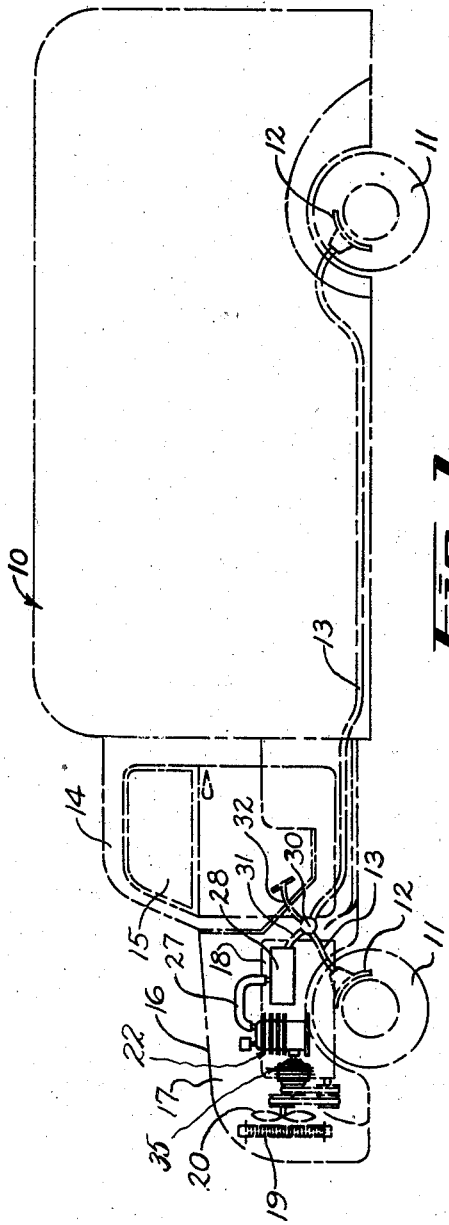
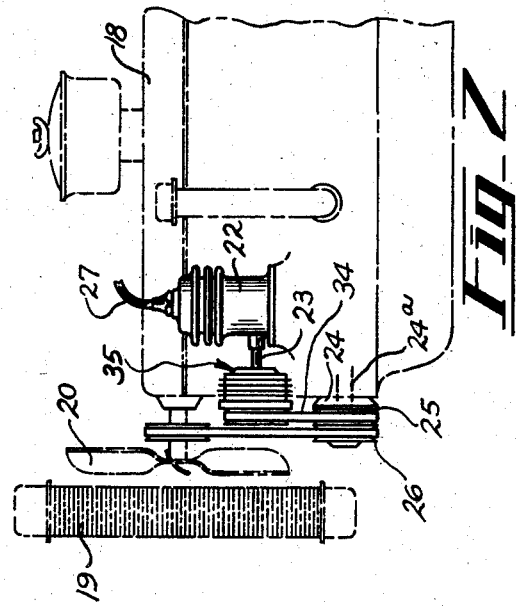
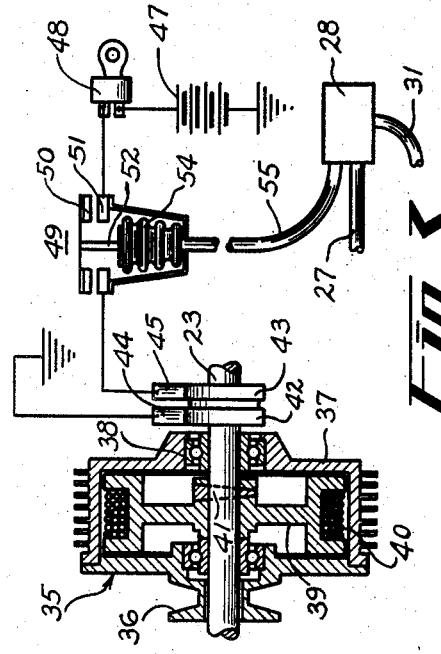
INVENTOR.
HOWARD J. FINDLEY
BY
Kwis Hudson Boughton & Williams
ATTORNEYS Patented Apr. 13, 1948

2,439,686

UNITED STATES PATENT OFFICE 2,439,686

DRIVE FOR AIR COMPRESSORS

Howard J. Findley, Chardon, Ohio, assignor to Eaton Manufacturing Company, Cleveland, Ohio, a corporation of Ohio Application August 24, 1944, Serial No. 550,961

2 Claims. (Cl. 230—15)

This invention relates to air compressors and more particularly to an improved drive for air compressors being used as auxiliary equipment on motor vehicles.

Air compressors are frequently provided on motor vehicles as a source of air pressure for operating brakes and for other auxiliary purposes. Where such compressors have been operated from the driving motor of the vehicle they have heretofore been subject to considerable abuse and to rapid wear by reason of the fact that the vehicle driving motor is a variable speed motor and at times is operated at a very high R. P. M. resulting in an excessive speed for the compressor. This condition is especially troublesome in the case of trucks and busses which frequently shift into low gear and the corresponding higher motor speeds result in the compressor being driven at an excessive speed during a considerable portion of the time. The operation of the compressors at such excessive speeds causes excessive wear requiring frequent repair or replacement and also dissipates a substantial percentage of the horsepower developed by the vehicle motor.

The present invention overcomes this problem by providing an improved drive for an air compressor in which a substantially constant speed coupling is employed in driving the compressor from a variable speed vehicle driving motor.

Another object of this invention is to provide an improved drive for an air compressor in which the coupling is a substantially constant speed magnetic coupling.

The invention also provides an improved drive of this character, in which a switch controlling the magnetic coupling is actuated in response to variations in the pressure of the air delivered by the compressor.

Still another object of this invention is to provide improved brake actuating mechanism for air-operated brakes of a motor vehicle, in which a constant speed magnetic coupling is employed for driving an air compressor from the vehicle motor and the effectiveness of such coupling is controlled in response to pressure variations in the air delivered by the compressor.

Other objects and advantages of the invention will be apparent from the following description when taken in conjunction with the accompanying sheet of drawings wherein Fig. 1 is a side elevation showing a motor vehicle to which the present invention has been applied.

Fig. 2 is an elevational view showing the vehicle motor and the improved driving means for operating the air compressor therefrom; and Fig. 3 is a diagrammatic view, partly in section, showing the substantially constant speed magnetic coupling and the pressure responsive control means.

Proceeding with a more detailed description of the invention, there is shown in Fig. 1 a motor vehicle 10 having wheels 11 provided with brakes 12 which are actuated or controlled by air under pressure supplied thereto through conduits 13. The vehicle 10 is also provided with cab or body 14 containing a driver's compartment 15 and with a hood 16 containing a motor compartment 17. A variable speed internal combustion motor 18 is located in the compartment 17 and is connected with the wheels 11 in a conventional manner for propelling the vehicle. The motor 18 is controlled from the driving compartment 15 and operates at speeds which may vary from an idling speed of approximately 500 R. P. M. to a maximum operating speed of approximately 3500 R. P. M. Associated with the vehicle motor 18 are the usual radiator 19 and cooling fan 20. The vehicle motor 18 can be a conventional internal combustion engine of either the reciprocating or rotary type or can be an internal combustion turbine.

For supplying the compressed air for actuating or controlling the wheel brakes 12, or for other auxiliary purposes, the motor vehicle 10 is equipped with an air compressor 22 which is mounted on or adjacent the vehicle driving motor 18. The compressor 22 includes a rotary drive shaft 23 which extends adjacent to an auxiliary power take-off means 24 of the vehicle motor 18 and which, in this instance, is in the form of a driven shaft 24a having pulleys 25 and 26 thereon. The air compressor 22 also includes an air delivery means or conduit 27 which is connected with a storage tank 28.

The flow of air to the wheel brakes 12 of the vehicle 10 is controlled by a suitable control valve 30 which may be located adjacent the driver's compartment 15 and with which the conduits 13 are connected. Air from the tank 28, or from the compressor 22 directly in the event that the tank 28 is omitted, is supplied to the control valve 30 through the conduit 31. The valve 30 is adapted to be manually actuated for causing the application or release of the wheel brakes 12, as by means of a brake pedal 32 located in the driver's compartment.

The air compressor 22 is connected with the auxiliary power take-off means 24 by suitable torque-transmitting means which, in this instance, utilizes a belt 34 extending around the pulley 25. An important feature of the present invention is the use of a substantially constant speed coupling 35 in the torque-transmitting means which connects the compressor 22 with the power take-off 24. This constant speed coupling is preferably in the form of an eddy-current device or magnetic coupling which is operable with slippage as will be further explained hereinafter. In this instance the coupling 35 is mounted on the compressor shaft 23 and is provided with a pulley 36 around which the belt 34 extends.

A magnetic coupling suitable for the purpose of the present invention is further illustrated in Fig. 3 of the drawing and comprises a housing 37 formed of magnetic material and rotatably mounted on the compressor shaft 23 by means of suitable bearings 38. The magnetic coupling also includes a rotor 39 constructed of magnetic material and carrying an energizing coil or winding 40. The rotor 39 is located in the housing 37 and is connected with the shaft 23 as by means of the pin 41. The winding 40 is adapted to be energized by a suitable electric circuit which includes slip rings 42 and 43 mounted on the shaft 23 in insulated relation and connected with the energizing winding, and a pair of brushes 44 and 45 cooperating with such slip rings.

The energizing circuit for the magnetic coupling 35 is connected with a suitable source of current, such as the storage battery 47 of the motor vehicle, and includes a key-operated switch 48 which may be the ignition switch of the vehicle. The energizing circuit for the magnetic coupling also includes a pressure responsive switch 49 having pairs of cooperating movable and stationary contacts 50 and 51. The movable contacts 50 are connected with or carried by a member 52 which is adapted to be actuated by a pressure responsive Sylphon or diaphragm device 54, the latter being connected with the air storage tank 28 by a conduit 55.

The magnetic coupling 35 is operable with slippage, as mentioned above, and when the winding 40 thereof is de-energized by the opening of either of the switches 48 or 49 the housing member 37 will be rotated idly about the rotor 39 and the compressor 22 will not be driven. When the winding 40 of the magnetic coupling is energized the rotor 39 will be driven from the housing 37 to cause operation of the compressor 22 for the delivery of air to the tank 28. During the operation of the vehicle 10 the housing 37 of the coupling is driven continuously from the power take-off 24 and the characteristics of the coupling are such that the amount of slippage which occurs between the housing and rotor will result in the compressor 22 always being driven at a substantially constant speed for all operating speeds of the driving motor 18 above a predetermined value. The air compressor 22 thus is driven at a speed which is substantially constant for all operating speeds of the vehicle motor coming within the usual driving speeds of the vehicle which ordinarily range from an idling speed of the motor to a vehicle speed on the order of ninety or one hundred miles per hour.

When the pressure of the air in the storage tank 28 reaches a predetermined value it will cause an automatic opening of the contacts of the switch 49 thereby de-energizing the magnetic coupling and permitting the air compressor to come to a stop. When the pressure in the tank drops to a predetermined value the contacts of the switch 49 are reclosed to again energize the magnetic coupling and cause the compressor to be driven from the vehicle motor 18.

Although the foregoing description refers particularly to an air compressor, it will be understood that the present invention can also be used in driving the compressor of a refrigerating apparatus or the like when such apparatus is employed as auxiliary equipment on a motor vehicle.

From the foregoing description and accompanying drawing it will now be readily understood that the present invention provides an improved drive for the air compressor of a motor vehicle which enables such compressor to be driven at a substantially constant speed and prevents such compressor from being operated at excessive speeds which usually result in rapid wear and early failure. It will be seen also that the present invention provides a novel pressure responsive control for a substantially constant speed magnetic coupling through which the air compressor is driven from a variable speed vehicle motor. In addition to the advantages already mentioned above, the magnetic coupling absorbs more or less of the pulsations and vibrations usually present in the load when a compressor is being driven and this provides for smoother operation as well as a reduced strain on the connecting belt.

While I have illustrated and described my improved drive for an air compressor in considerable detail, it will be understood, of course, that I do not wish to be correspondingly limited but regard my invention as including all changes and modifications coming within the spirit of the invention and the scope of the appended claims.

Having thus described my invention, I claim:

1. A compressor system for a motor vehicle having a variable speed internal combustion driving engine provided with an ignition circuit and a power take-off, comprising a compressor adapted to deliver gaseous medium under pressure, an electromagnetic coupling connecting said compressor with said power take-off and being operable with continuous slippage while energized, a circuit for energizing said coupling, a switch device controlling said circuit and adapted to be actuated automatically in response to variations in the pressure of said medium on the delivery side of the compressor, and a second switch device controlling said circuit and serving also as the ignition switch for said engine.

2. A compressor system for a motor vehicle having a variable speed internal combustion driving engine provided with an ignition circuit and a power take-off, comprising a tank, a compressor adapted to deliver gaseous medium under pressure to said tank, an electromagnetic coupling connecting said compressor with said power take-off and being operable with continuous slippage while energized, a circuit for energizing said coupling, a switch device controlling said circuit and adapted to be actuated automatically in response to variations in the pressure of the medium in said tank, and a second switch device controlling said circuit and serving also as the ignition switch for said engine.

HOWARD J. FINDLEY.

REFERENCES CITED

The following references are of record in the file of this patent:

UNITED STATES PATENTS

| Number | Name | Date |
|---|---|---|
| 1,243,727 | Fried | Oct. 23, 1917 |
| 1,322,377 | Utterbaugh | Nov. 18, 1919 |
| 1,341,531 | Alexander | May 25, 1920 |
| 2,317,135 | Crittenden et al. | Apr. 20, 1943 |
| 2,351,646 | Van Vleck | June 20, 1944 |